US010427592B2

(12) United States Patent
Kearney et al.

(10) Patent No.: US 10,427,592 B2
(45) Date of Patent: Oct. 1, 2019

(54) CAR LIGHT SENSOR WARNING FOR HEADLIGHTS

(71) Applicant: Robert Bosch GmbH, Stuttgart (DE)

(72) Inventors: Norbert Wolfgang Kearney, Wuestenrot (DE); Douglas T. Patterson, Summerville, SC (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/791,955

(22) Filed: Oct. 24, 2017

(65) Prior Publication Data

US 2019/0118701 A1    Apr. 25, 2019

(51) Int. Cl.
  *B60Q 1/26* (2006.01)
  *B60Q 1/14* (2006.01)
  *B60Q 5/00* (2006.01)
  *B60Q 11/00* (2006.01)
  *B60Q 1/00* (2006.01)

(52) U.S. Cl.
  CPC ......... *B60Q 1/2603* (2013.01); *B60Q 1/0076* (2013.01); *B60Q 1/143* (2013.01); *B60Q 1/1423* (2013.01); *B60Q 5/005* (2013.01); *B60Q 11/005* (2013.01); *B60Q 2300/21* (2013.01); *B60Q 2300/305* (2013.01); *B60Q 2300/312* (2013.01); *B60Q 2300/314* (2013.01)

(58) Field of Classification Search
  CPC .... B60Q 1/1423; B60Q 1/143; B60Q 1/0076; B60Q 1/04; B60Q 1/2603; B60Q 5/005; B60Q 11/005; B60Q 2300/305; B60Q 2300/312; B60Q 2300/314
  See application file for complete search history.

(56) References Cited

U.S. PATENT DOCUMENTS

| | | | | |
|---|---|---|---|---|
| 4,104,613 A | * | 8/1978 | Chaput | B60Q 11/005 315/82 |
| 4,125,824 A | * | 11/1978 | McPherson | G07C 5/0833 315/80 |
| 4,868,480 A | * | 9/1989 | van der Linde | H02J 7/1438 322/7 |
| 5,113,175 A | | 5/1992 | Adell | |

(Continued)

FOREIGN PATENT DOCUMENTS

| | | |
|---|---|---|
| DE | 19620779 C1 | 5/1997 |
| DE | 102015001932 A1 | 8/2015 |

(Continued)

*Primary Examiner* — Hai Phan
*Assistant Examiner* — Son M Tang
(74) *Attorney, Agent, or Firm* — Michael Best & Friedrich LLP

(57) ABSTRACT

A method and system for controlling exterior lights on a vehicle. The method includes receiving an input indicative of a desired mode of operation of the exterior lights from a user-selectable input device. The user-selectable input device includes an on-setting, an off-setting, and an automatic-setting. The method further includes receiving sensor data indicative of a level of visibility outside the vehicle, comparing the sensor data to a threshold, and generating, by an electronic processor, a notification indicative of an improper positioning of the user-selectable input device when the sensor data indicates that the level of visibility is less than the threshold and the user-selectable input device is positioned in the off-setting.

16 Claims, 4 Drawing Sheets

(56) References Cited

U.S. PATENT DOCUMENTS

| | | | | |
|---|---|---|---|---|
| 5,231,373 A * | 7/1993 | Freeman | B60Q 1/1423 | 307/10.8 |
| 5,473,306 A * | 12/1995 | Adell | B60Q 1/143 | 307/10.8 |
| 5,523,630 A * | 6/1996 | Smelley | B60Q 1/143 | 307/10.8 |
| 5,666,028 A * | 9/1997 | Bechtel | B60Q 1/1423 | 307/10.8 |
| 5,734,203 A * | 3/1998 | Slater | B60Q 1/14 | 307/10.1 |
| 6,677,986 B1 * | 1/2004 | Pochmuller | B60Q 1/1423 | 348/149 |
| 6,753,770 B2 * | 6/2004 | Schooley | B60Q 1/46 | 340/332 |
| 7,005,977 B1 * | 2/2006 | Tengler | B60Q 1/143 | 340/457 |
| 7,449,997 B2 * | 11/2008 | Furusawa | B60Q 1/06 | 340/438 |
| 9,020,616 B2 * | 4/2015 | Kishita | G05B 19/0426 | 307/9.1 |
| 10,029,608 B2 * | 7/2018 | Miller | B60Q 1/08 | |
| 2002/0060522 A1 * | 5/2002 | Stam | B60Q 1/085 | 315/82 |
| 2008/0129206 A1 * | 6/2008 | Stam | B60Q 1/085 | 315/82 |
| 2010/0213847 A1 | 8/2010 | Biondo et al. | | |
| 2010/0295450 A1 | 11/2010 | Oishi et al. | | |
| 2013/0201704 A1 | 8/2013 | Lin et al. | | |
| 2013/0234593 A1 * | 9/2013 | Nordstrom | B60Q 1/143 | 315/80 |
| 2013/0274999 A1 * | 10/2013 | Bengtsson | B60Q 1/085 | 701/36 |
| 2015/0035434 A1 * | 2/2015 | Bummel | B60Q 1/1423 | 315/82 |
| 2015/0035435 A1 * | 2/2015 | Alberti | B60Q 1/0076 | 315/82 |
| 2015/0175069 A1 | 6/2015 | Yang | | |
| 2016/0016505 A1 | 1/2016 | Yin et al. | | |
| 2016/0096466 A1 | 4/2016 | Okumura et al. | | |
| 2016/0343254 A1 * | 11/2016 | Rovik | B60Q 9/00 | |
| 2017/0217360 A1 * | 8/2017 | Pierfelice | B60Q 1/085 | |

FOREIGN PATENT DOCUMENTS

| | | |
|---|---|---|
| DE | 102015103971 A1 | 10/2015 |
| DE | 102014013185 A1 | 3/2016 |
| JP | H10129340 A | 5/1998 |

\* cited by examiner

CAR LIGHT SENSOR WARNING FOR HEADLIGHTS

BACKGROUND

Many vehicles include position switches that are operable to turn exterior lights of the vehicle on and off. The position switches may control the headlights, taillights, fog lamps, and other exterior lights of the vehicle. In some vehicles, the light position switch includes an "auto" setting, an "on" setting, and an "off" setting. In the auto setting, the vehicle may use a light sensor to determine the amount of ambient light outside the vehicle, and when the ambient light is insufficient to provide good visibility, the vehicle automatically turns on the exterior lights.

SUMMARY

One deficiency of automatic vehicle light systems is that drivers become reliant on the vehicle's automatic settings to control the headlights. Drivers may operate the vehicle without checking the position of the light position switch. In some cases, the light position switch is positioned in the off-setting when the driver is operating the vehicle. This can create a hazard when the vehicle is operated at night.

Embodiments provide, among other things, a system and a method of controlling the exterior lights on a vehicle. The systems and methods use driver notifications to provide warnings to a driver for improper positioning the light position switch. In addition, the systems and methods utilize various sensors to provide automatic functionally beyond current exterior light control systems.

One embodiment provides a method of controlling exterior lights on a vehicle. The method includes receiving an input indicative of a desired mode of operation of the exterior lights from a user-selectable input device. The user-selectable input device includes an on-setting, an off-setting, and an automatic-setting. The method further includes receiving sensor data indicative of a level of visibility outside the vehicle, comparing the sensor data to a threshold, and generating, by an electronic processor, a notification indicative of an improper positioning of the user-selectable input device when the sensor data indicates that the level of visibility is less than the threshold and the user-selectable input device is positioned in the off-setting.

Another embodiment provides a light control system for controlling exterior lights on a vehicle. The system includes a sensor configured to sense a level of visibility outside the vehicle, a user-selectable input device including an on-setting, an off-setting, and an automatic-setting; and an electronic processor communicatively connected to the sensor and the user-selectable input device. The electronic processor is configured to receive a user-selectable input indicative of a desired mode of operation of the exterior lights from the user-selectable input device, receive sensor data from the sensor, and compare the sensor data to a threshold. The electronic processor is further configured to generate a notification indicative of an improper positioning of the user-selectable input device when the sensor data indicates that the level of visibility is less than the threshold and the user-selectable input device is positioned in the off-setting.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
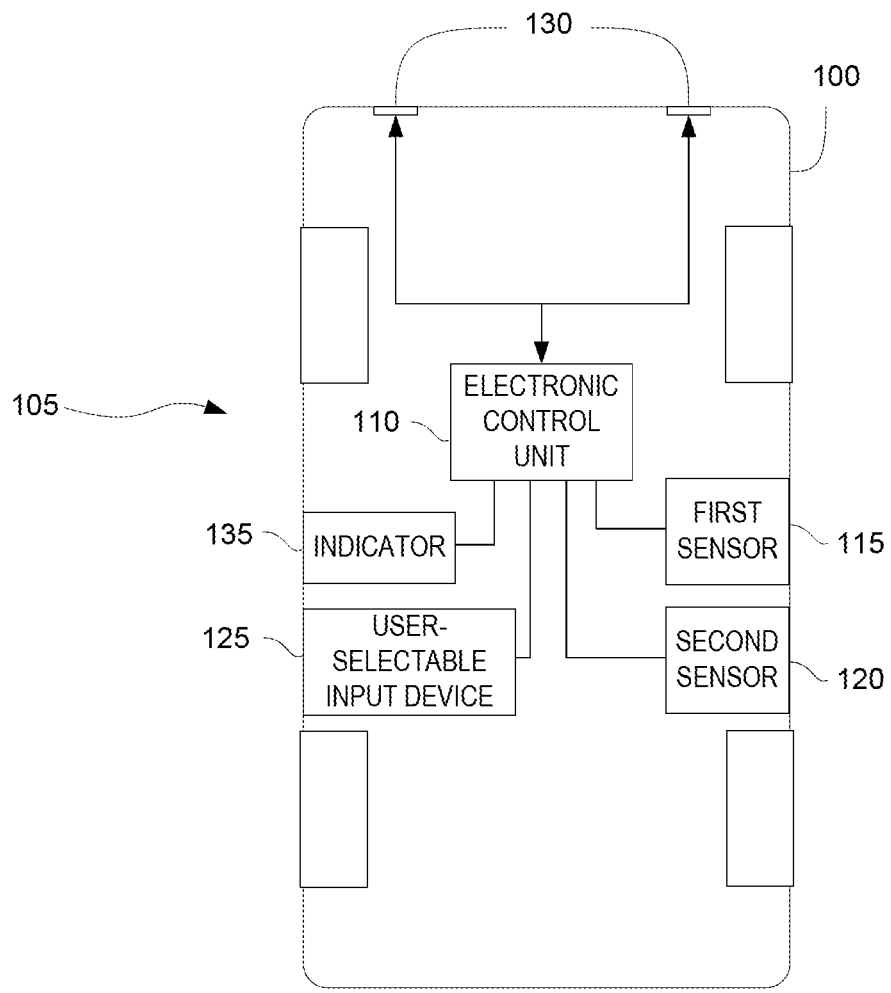
FIG. 1 is a block diagram of a vehicle equipped with a light control system for controlling exterior lights on a vehicle according to one embodiment.

FIG. 1 illustrates a vehicle 100 equipped with a light control system 105 for controlling exterior lights on the vehicle 100 according to one example. As discussed in more detail below, the light control system 105 controls various operational lights of the vehicle 100 including headlights, tail lights, fog lights, and others. The vehicle 100, although illustrated as a four-wheeled vehicle, encompasses various types and designs. For example, it is contemplated that the vehicle 100 may include an automobile, a motorcycle, a truck, a bus, a semi-tractor, and others.

In the example illustrated, the light control system 105 includes an electronic control unit (ECU) 110, a first sensor 115, a second sensor 120, a user-selectable input device 125, exterior lights 130, and an indicator 135. The electronic control unit 110 may be communicatively connected to the first sensor 115, the second sensor 120, the user-selectable input device 125, and the exterior lights 130 via various types of connections and using various types of communication protocols. For example, the electronic control unit 110, the first sensor 115, the second sensor 120, the user-selectable input device 125, the exterior lights 130, and the indicator 135 may be directly wired, wired through a communication bus, or wirelessly connected (for example, via a wireless network). It should be noted that the above-listed components may be located in various locations around the vehicle 100 and that the illustration of FIG. 1 is not intended to indicate any sort of positional relationship.

The first sensor 115 may include various and multiple types of sensor technologies. For example, the first sensor 115 may include a light sensor with a photocell or photoresistor that detects an amount of light (e.g., sunlight) external to the vehicle 100. In another example, the first sensor 115 includes a sensing element to detect an amount of moisture or precipitation present in the air outside the vehicle 100. In yet another example, the first sensor 115 includes a sensing element to detect an amount of fog present in the air outside the vehicle 100. In some embodiments, the first sensor 115 is configured to use multiple types of sensor technologies listed above to sense an overall level of visibility outside the vehicle 100. In whatever the particular configuration, the first sensor 115 is configured to sense a level of visibility outside the vehicle 100 and to send the sensor data to the electronic control unit 110.

The second sensor 120 may also include various and multiple types of sensor technologies. The second sensor 120 provides another independent source of sensor data beyond what the first sensor 115 provides. The second sensor 120 may therefore be configured as a different type of sensor than the first sensor 115, which may include multiple different types of sensing elements. The second sensor 120, for example, may include one or more of the sensing technologies listed above in relation to the first sensor 115 in addition to others. Additionally, the sensor data from the second sensor 120 may include an estimation of an amount of ambient light based on the time of day and time of year information provided by other vehicle systems.

The user-selectable input device 125 is a device that enables driver control over the light control system 105. In some embodiments, the user-selectable input device 125, or portions thereof, is included on a turn-signal lever. For example, the turn-signal lever may include an on-off-auto position switch configured to switch modes for the light control system 105. In some embodiments, the user-selectable input device 125 includes buttons, switches, toggles, or other input devices that are separate from the turn signal lever. For example, the user-selectable input device 125 may include buttons or selectable icons on a display (for example, a touchscreen display) that is configured to input control commands to the vehicle 100. In some embodiments, the user-selectable input device 125 includes a push-button or switch that is independent from the on-off-auto position switch that is configured to override the automatic functionality described below.

The exterior lights 130 may include headlights (i.e., headlamps), taillights, running lights, fog lamps, and others. The exterior lights 130 are controllable via the on-off-auto position switch by the driver of the vehicle 100. In particular, when the on-off-auto position switch is in the on-setting (i.e., the "on" position), the exterior lights 130 are lit. When the on-off-auto position switch is in the auto-setting (i.e., the "auto" position), the exterior lights 130 are controlled by the electronic control unit 110 based on the input received by the first sensor 115. For example, when the first sensor 115 senses a level of light external to the vehicle 100 that is below a predetermined level, the electronic control unit 110 is configured to activate the exterior lights 130. When the on-off-auto position switch is in the off-setting (i.e., the "off" position), the electronic control unit 110 is configured to perform several functions based on the input received from the second sensor 120 including, in some embodiments, activating the indicator 135, turning on the exterior lights 130, or both.

The indicator 135 provides an indication to the driver of the vehicle 100 of the status of the light control system 105. In some embodiments, the indicator 135 includes a dashboard light, icon, or other visual indicator in view of the driver of the vehicle 100. In another embodiment, the indicator 135 includes an audial warning, such as a tone, beep, or other sound, that provides notifications to the driver. In some embodiments, the indicator 135 includes both visual and audial indications to the driver. The indicator 135 may include multiple status lights or multiple different status indicators on a single indicator light. For example, the indicator 135 may be configured to display an indication of the positon of the on-off-auto position switch. In some embodiments, the indicator 135 is configured to display the status of the exterior lights 130 (i.e., on or off) and display an indication of the position of the on-off-auto position switch. For example, the indicator 135 may simultaneously display that the exterior lights 130 are activated and that the on-off-auto position switch is positioned in the "off" position. In this instance, the indicator 135 shows that the light control system 105 is in an override state in which the light control system 105 is overriding the position of the on-off-auto position switch based on an input from the first sensor 115 the second sensor 120, or both.

Figure 2:
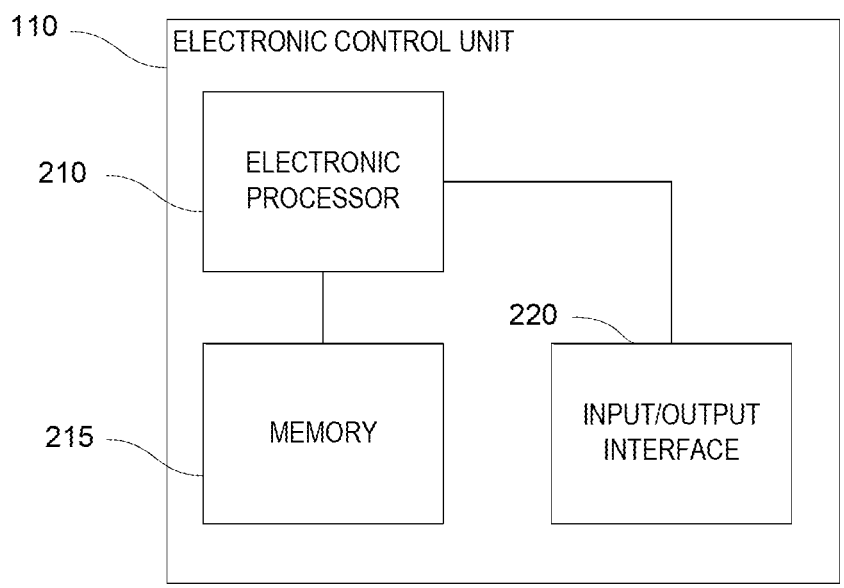
FIG. 2 is a block diagram of an electronic control unit of the system of FIG. 1 according to one embodiment.

FIG. 2 is a block diagram of an electronic control unit 110 of the light control system 105 according to one embodiment. The electronic control unit 110 includes a plurality of electrical and electronic components that provide power, operational control, and protection to the components and modules within the electronic control unit 110. The electronic control unit 110 includes, among other things, an electronic processor 210 (such as a programmable electronic microprocessor, microcontroller, or similar device), a memory 215 (for example, non-transitory, machine readable memory), and an input/output interface 220. In some embodiments, the electronic control unit 110 includes additional, fewer, or different components. For example, the electronic control unit 110 may be implemented in several independent electronic control units or modules each configured to perform specific steps or functions of the electronic control unit 110.

The electronic processor 210, in coordination with the memory 215, the input/output interface 220, and other components of the electronic control unit 110, is configured to perform the processes and methods discussed herein. For example, the electronic processor 210 is configured to retrieve from memory 215 and execute, among other things, instructions related to receiving sensor data from the first sensor 115 and the second sensor 120, analyzing the sensor data, and generating a signal to activate and control the exterior lights 130 and the indicator 135. The input/output interface 220 may include one or more input and output modules for communicating with the other components of the light control system 105 as well as other components of the vehicle 100. For example, the input/output interface 220 is configured to communicate with the first sensor 115, the second sensor 120, the exterior lights 130, and the indicator 135.

Figure 3:
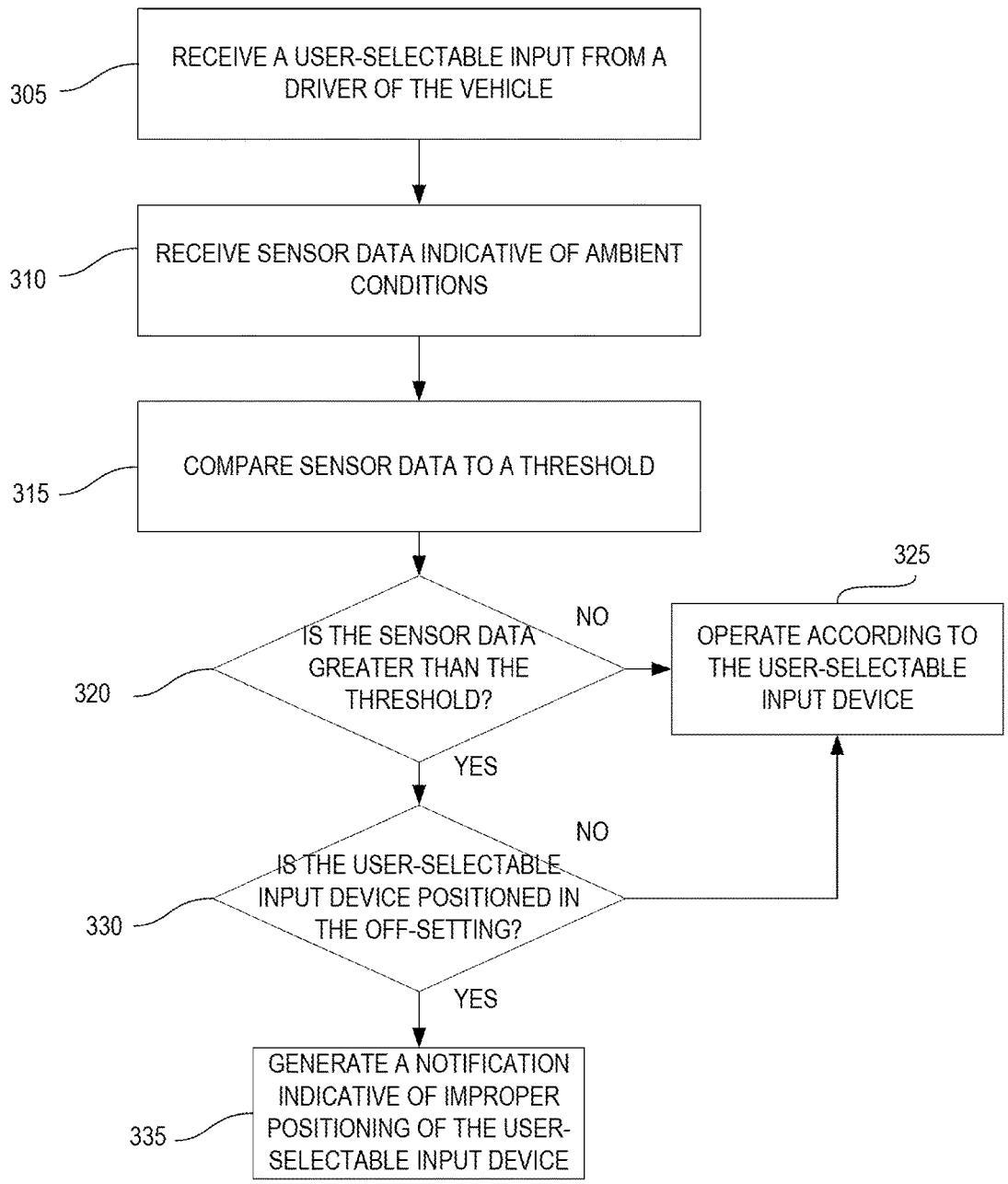
FIG. 3 is a flowchart of a method of operating the system of FIG. 1 according to one embodiment.

FIG. 3 illustrates a flowchart of a method of controlling the exterior lights 130 using the light control system 105 according to one embodiment. In the illustrated embodiment, the electronic processor 210 receives a user-selectable input from a driver of the vehicle 100 (block 305). For example, the electronic processor 210 may receive a position selection from the user-selectable input device 125 that indicates a desired state for the exterior lights 130. The electronic processor 210 receives sensor data indicative of a level of visibility outside the vehicle 100 (block 310). For example, the electronic processor 210 may receive sensor data from the first sensor 115 that indicates an amount of ambient light outside the vehicle 100. The electronic processor 210 may also receive sensor data from the second sensor 120 that indicates a level of visibility (for example, via a precipitation sensor). The electronic processor 210 compares the sensor data to a threshold value stored within the electronic control unit 110 (block 315).

The electronic processor 210 then determines whether the sensor data has a value that is greater than or lower than the threshold (block 320). When the value is greater than the threshold (for example, when the voltage output of the sensor indicates a high level of ambient light), the electronic processor 210 operates the light control system 105 according to the user-selectable input (block 325). For example, the electronic processor 210 activates the exterior lights 130 when the user-selectable input device 125 is positioned in the on-position, deactivates the exterior lights 130 when user-selectable input device 125 is in the off-setting, and activates the exterior lights 130 according to the input from the first sensor 115 when the user-selectable input device 125 is in the auto-setting.

Conversely, when the sensor data has a value that is lower than the threshold (for example, when the voltage output of the sensor indicates a low level of ambient light), the electronic processor 210 determines whether the user-selectable input device 125 is positioned in the off-setting (block 330). When the user-selectable input device 125 is positioned in the off-position and when the sensor data is lower than the threshold, the electronic processor 210 generates a notification indicative of improper positioning of the user-selectable input device 125 (block 335). For example, the electronic processor 210 activates a light or icon on the dashboard of the vehicle 100 that reads "check headlights" or "caution headlights are disabled."

In some embodiments, the electronic processor 210 analyzes both the sensor data from the first sensor 115 and the second sensor 120 to estimate a level of visibility based on multiple factors. For example, the electronic processor 210 may determine a level of visibility based on an amount of ambient light and a level of precipitation. In this instance, the electronic processor 210 combines the sensor data into a combined value indicative of an overall level of visibility outside the vehicle 100 and then compares the overall level of visibility to the threshold of block 320.

In some embodiments, the electronic processor 210 uses the sensor data from the first sensor 115 to automatically control the exterior lights 130 only when the on-off-auto position switch is positioned in the auto-setting. In this instance, the electronic processor 210 uses the sensor data from the second sensor 120 to generate the notification of improper positioning of the user-selectable input device 125 when the on-off-auto position switch is in the off-setting.

Figure 4:
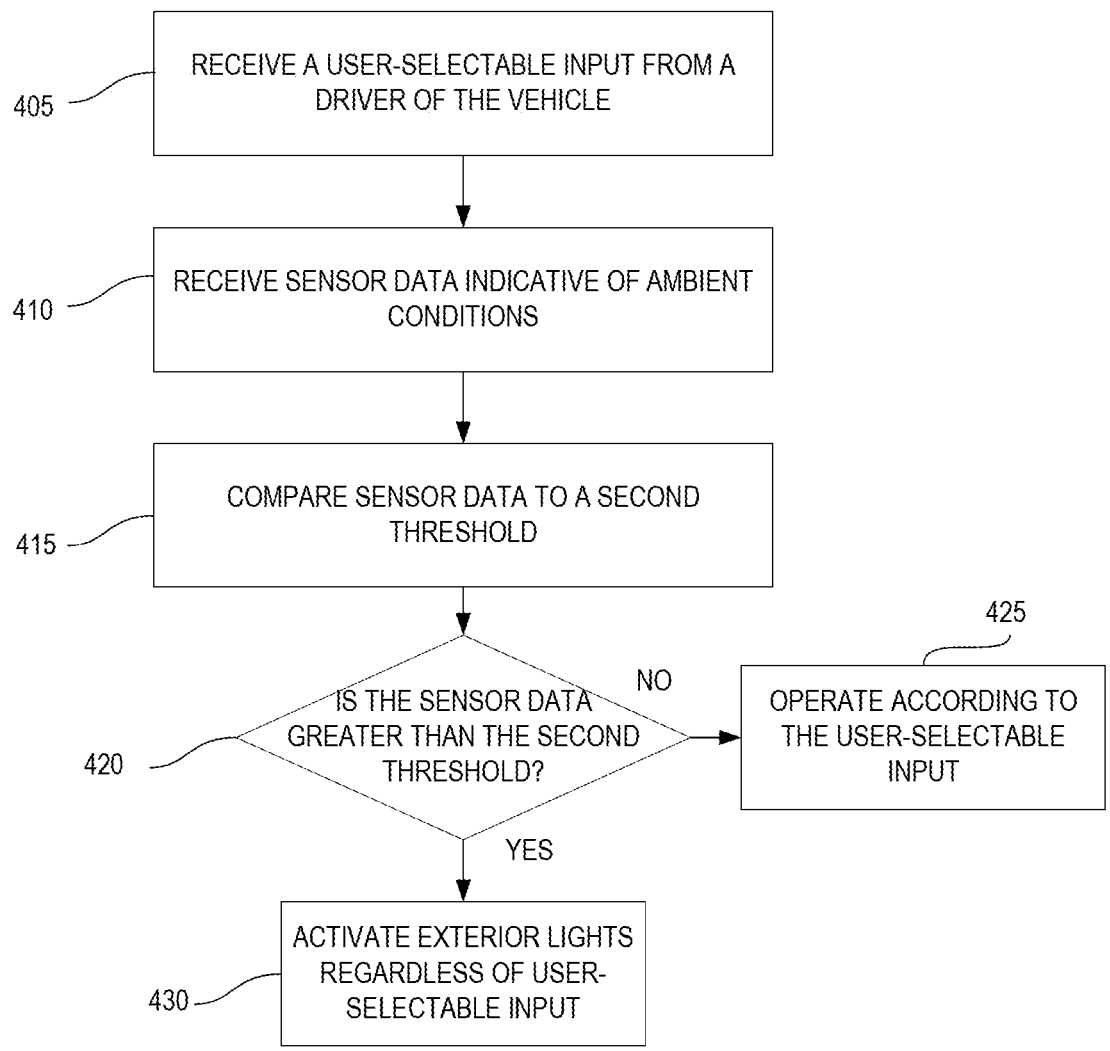
FIG. 4 is a flowchart of method of operating the system of FIG. 1 according to another embodiment.

FIG. 4 illustrates a flowchart of a method of controlling the exterior lights 130 using the light control system 105 according to another embodiment. The method illustrated in FIG. 4 may be performed independently or in conjunction with the method illustrated in FIG. 3. In the embodiment illustrated in FIG. 4, the electronic processor 210 receives a user-selectable input from a driver of the vehicle (block 405). For example, the electronic processor 210 may receive a position selection from the user-selectable input device 125 that indicates a desired state for the exterior lights 130. The electronic processor 210 receives sensor data indicative of a level of visibility outside the vehicle 100 (block 410). For example, the electronic processor 210 may receive sensor data from the first sensor 115 that indicates an amount of ambient light outside the vehicle 100 or from the second sensor 120 that indicates an amount of precipitation outside the vehicle 100.

The electronic processor 210 compares the sensor data to another threshold value stored within the electronic control unit 110 (block 415). In some embodiments, this threshold is lower than the threshold used in the method of FIG. 3. The electronic processor 210 then determines whether the sensor data has a value that is greater than or less than this threshold (block 420). When the value is greater than the threshold (for example, when the voltage output of the sensor indicates a moderate amount of ambient light such as greater than 400 lux), the electronic processor 210 operates the light control system 105 according to the user-selectable input (block 425). For example, the electronic processor 210 activates the exterior lights 130 when the user-selectable input device 125 is positioned in the on-setting, deactivates the exterior lights 130 when user-selectable input device 125 is in the off-position, and activates the exterior lights 130 according to the input from the first sensor 115 when the user-selectable input device 125 is in the auto-setting.

Conversely, when the sensor data has a value that is lower than this threshold (for example, when the voltage output of the sensor indicates a low amount of ambient light such as less than 40 lux), the electronic processor 210 activates the exterior lights 130 regardless of the position of the user-selectable input device 125 (block 430). As a consequence, when the level of visibility outside the vehicle 100 is less than a lower threshold, the electronic processor 210 automatically activates the exterior lights 130.

In the method of FIG. 4, the electronic processor 210 may analyze both the sensor data from the first sensor 115 and the second sensor 120 to estimate a level of visibility based on multiple factors. For example, the electronic processor 210 may determine a level of visibility based on an amount of ambient light and a level of precipitation. In this instance, the electronic processor 210 combines the sensor data into a combined value indicative of an overall level of visibility outside the vehicle 100 and then compares the overall level of visibility to the threshold of block 420.

In some embodiments, the electronic processor 210 uses the sensor data from the first sensor 115 to automatically control the exterior lights 130 only when the on-off-auto position switch is positioned in the auto-setting. In this instance, the electronic processor 210 uses the sensor data from the second sensor 120 to automatically activate the exterior lights 130 when the on-off-auto position switch is positioned in the off-setting.

When both the method of FIG. 3 and the method of FIG. 4 are used in conjunction, the electronic processor 210 first generates the notification that the exterior lights 130 should be active at the higher threshold, and then activates the exterior lights 130 at the lower threshold. As a consequence, when the level of visibility outside the vehicle 100 gradually worsens (for example, during the evening or as a rainstorm approaches), the electronic processor 210 first warns the driver that the exterior lights 130 are not active and second automatically activates the exterior lights 130.

In some embodiments, the method of FIG. 3 and the method of FIG. 4 use both the first sensor 115 and the second sensor 120. In these cases, the electronic processor 210 may compare sensor data from the first sensor 115 to a first threshold and sensor data from the second sensor 120 to a second threshold. Only when the sensor data from the first sensor 115 and sensor data from the second sensor 120 are both above their respective thresholds does the electronic processor 210 activate the indication (block 330) or activate the exterior lights 130 (block 430). This provides redundancy in the case of sensor failure or otherwise inaccurate sensor data.

In some embodiments, the driver may select an option on the user-selectable input device 125 to disable the indication that occurs in the method of FIG. 3, disable the activation of the exterior lights 130 that occurs in the method of FIG. 4, or both. In this instance, the selection is separate from the on-off-auto position switch. For example, the selection may be performed by the driver selecting a push button or an icon on a display. The selection is then reset whenever the vehicle 100 is turned off. The driver must reselect the option from the user-selectable input device 125 the next time the vehicle 100 is turned on to re-disable the option.

Various features, advantages, and embodiments are set forth in the following claims.

What is claimed is:

1. A method of controlling exterior lights on a vehicle, the method comprising:
   receiving an input indicative of a desired mode of operation of the exterior lights from a user-selectable input device, the user-selectable input device including an on-setting, an off-setting, and an automatic-setting;
   receiving sensor data indicative of a level of visibility outside the vehicle;
   comparing the sensor data to a first threshold;
   automatically activating the exterior lights while the user-selectable input device is positioned in the automatic-setting in response to determining that the level of visibility is less than the first threshold;
   generating, by an electronic processor, a notification indicative of an improper positioning of the user-selectable input device when the sensor data indicates that the level of visibility is less than the first threshold and the user-selectable input device is positioned in the off-setting;
   comparing the sensor data to a second threshold, the second threshold being lower than the first threshold; and
   automatically activating the exterior lights while the user-selectable input device is positioned in the off-setting in response to determining that the level of visibility is less than the second threshold.

2. The method according to claim 1, wherein generating the notification indicative of improper positioning of the user-selectable input device includes activating a visual indicator for a driver of the vehicle.

3. The method according to claim 1, wherein generating the notification indicative of improper positioning of the user-selectable input device includes activating an audial indicator.

4. The method according to claim 1, further comprising generating a second notification indicative of an override of the user-selectable input device in response to automatically activating the exterior lights while the user-selectable input device is positioned in the off-setting.

5. The method according to claim 1, wherein the sensor data indicative of the level of visibility outside the vehicle is indicative of an amount of ambient light that is present outside the vehicle.

6. The method according to claim 1, wherein the sensor data indicative of the level of visibility outside the vehicle is indicative of an amount of precipitation or fog that is present outside the vehicle.

7. The method according to claim 1, wherein the sensor data indicative of the level of visibility outside the vehicle is indicative of an amount of ambient light based on a time of day.

8. The method according to claim 1, wherein the sensor data includes first sensor data and second sensor data, the first sensor data indicative of a first ambient condition external from the vehicle and the second sensor data indicative of a second ambient condition external to the vehicle, the second ambient condition being different than the first ambient condition.

9. The method according to claim 8, the method further comprising
   activating the exterior lights when the first sensor data is greater than a first threshold and the user-selectable input device is positioned in the automatic-setting; and
   generating the notification indicative of the improper positioning of the user-selectable input device when the second sensor data is greater than a second threshold and the user-selectable input device is positioned in the off-setting.

10. The method according to claim 9, wherein the first sensor data is indicative of an amount of precipitation sensed by a first sensor, and wherein the second sensor data is indicative of an amount of light sensed by a second sensor.

11. A light control system for controlling exterior lights on a vehicle, the system comprising:
    a sensor configured to sense a level of visibility outside the vehicle;
    a user-selectable input device including an on-setting, an off-setting, and an automatic-setting; and
    an electronic processor communicatively connected to the sensor and the user-selectable input device, the electronic processor configured to
      receive a user-selectable input indicative of a desired mode of operation of the exterior lights from the user-selectable input device,
      receive sensor data from the sensor,
      compare the sensor data to a first threshold,
      automatically activate the exterior lights while the user-selectable input device is positioned in the automatic-setting in response to determining that the level of visibility is less than the first threshold,
      generate a notification indicative of an improper positioning of the user-selectable input device when the sensor data indicates that the level of visibility is less than the threshold and the user-selectable input device is positioned in the off-setting,
      compare the sensor data to a second threshold, the second threshold being lower than the first threshold, and
      automatically activate the exterior lights while the user-selectable input device is positioned in the off-setting in response to determining that the level of visibility is less than the second threshold.

12. The system according to claim 11, wherein the electronic processor is further configured to generate a second notification indicative of an override of the user-selectable input device in response to activating the exterior lights while the user-selectable input device is positioned in the off-setting, the second notification being different than the first notification.

13. The system according to claim 11, wherein the sensor is a light sensor, and wherein the sensor data indicative of the level of visibility outside the vehicle is indicative of an amount of ambient light that is present outside the vehicle.

14. The system according to claim 11, wherein the sensor is a precipitation sensor, and wherein the sensor data indicative of the level of visibility outside the vehicle is indicative of an amount of precipitation that is present outside the vehicle.

15. The system according to claim 11, wherein the sensor data includes first sensor data and second sensor data, the first sensor data indicative of a first ambient condition external from the vehicle and the second sensor data indicative of a second ambient condition external to the vehicle, the second ambient condition being different than the first ambient condition.

16. The system according to claim 15, wherein the electronic processor is further configured to
   activate the exterior lights when the first sensor data is greater than a first threshold and the user-selectable input device is positioned in the automatic-setting; and
   generate the notification indicative of the improper positioning of the user-selectable input device when the second sensor data is greater than a second threshold and the user-selectable input device is positioned in the off-setting.

* * * * *